United States Patent [19]

Hino et al.

[11] Patent Number: 4,853,194
[45] Date of Patent: Aug. 1, 1989

[54] METHOD FOR TREATING EXHAUST GAS

[75] Inventors: Masao Hino; Kenichi Yoneda, both of Hiroshima; Masato Miyake, Tokyo; Hidehiko Otani, Kobe; Noriya Shingu, Osaka; Tsukasa Isahaya, Himeji; Shigeshi Hamada, Himeji; Tsuyoshi Arahori, Himeji, all of Japan

[73] Assignee: Mitsubishi Jukogyo Kabushiki Kaisha, Tokyo, Japan

[21] Appl. No.: 17,829

[22] Filed: Feb. 24, 1987

[30] Foreign Application Priority Data

Feb. 24, 1986 [JP] Japan ................................. 61-37326

[51] Int. Cl.$^4$ .......................... B01J 8/00; C01B 17/00; C01B 21/00
[52] U.S. Cl. .................................... 423/239; 423/242; 55/10
[58] Field of Search ............... 55/10; 423/235, 235 D, 423/239, 242 A, 242 R

[56] References Cited

U.S. PATENT DOCUMENTS

| | | | |
|---|---|---|---|
| 3,665,676 | 5/1972 | McKewen | 55/10 |
| 4,039,304 | 8/1977 | Bechthold et al. | 55/10 |
| 4,350,670 | 9/1982 | Matsuda et al. | 423/239 |

FOREIGN PATENT DOCUMENTS

| | | |
|---|---|---|
| 3320688 | 12/1984 | Fed. Rep. of Germany . |
| 51-37077 | 3/1976 | Japan ................. 55/10 |
| 56-155617 | 12/1981 | Japan . |
| 60-41529 | 3/1985 | Japan . |
| 61-111125 | 5/1985 | Japan . |
| 60-212210 | 10/1985 | Japan . |
| 60-222135 | 11/1985 | Japan . |
| 62-181519 | 8/1986 | Japan . |
| 62-4451 | 1/1987 | Japan . |
| 62-27053 | 2/1987 | Japan . |
| 2721878 | 11/1978 | United Kingdom . |
| 2146261 | 4/1985 | United Kingdom . |
| 2171090 | 8/1986 | United Kingdom . |

OTHER PUBLICATIONS

6032 JAPCA Journal of the Air Polution Control Association, vol. 33 (1983), Jan., No. 1, pp. 23–28.
6032 JAPCA Journal of the Air Polution Control Association, vol. 36 (1986), Aug. 1986, pp. 953–958.
8193 Staub-Reinhaltung der Luft 44 (1984), Jun., No. 6, pp. 285–291.

*Primary Examiner*—Gregory A. Heller
*Attorney, Agent, or Firm*—Toren, McGeady & Associates

[57] ABSTRACT

A method for treating an exhaust gas which includes leading a coal-fired exhaust gas to a dry denitrating device, removing oxides of nitrogen from the exhaust gas in the device, leading the exhaust gas to a dry electric dust collector and a wet waste smoke desulfurizing device disposed at downstream positions, and removing dust from the exhaust gas in these devices. A sodium compound containing solution is sprayed into the exhaust gas flowing between the dry denitrating device and the dry electric dust collector thereby increasing the efficiency of the dust collector, and the resulting dry solids are then collected together with the dust by the dry electric dust collector.

2 Claims, 2 Drawing Sheets

METHOD FOR TREATING EXHAUST GAS

FIELD OF THE INVENTION AND RELATED ART STATEMENT

The present invention relates to a method for treating a coal-fired exhaust gas containing harmful components such as sulfur compounds and dust, and, more particularly the present invention provides a method for improving the performance of a dry electric dust collector and for allowing no or a smaller waste liquid to flow out from a wet waste smoke desulfurizing device.

In recent years, because of a worsened fuel situation, coal, which is an inexpensive fuel source, is being reconsidered. However, the coal-fired exhaust gas contains harmful components in large quantities, for example, dust at a concentration of several grams to tens of grams per cubic meter (N), sulfur oxides at hundreds to thousands of parts per million, nitrogen oxides at hundreds of parts per million, and the like. Therefore, as opposed to substituting the inexpensive coal for an expensive fuel such as heavy oil, it is essential and inevitable to develop a technique by which these harmful components are removed effectively from the coal-fired exhaust gas.

From the viewpoint of preventing air pollution, the technique is being brought into practice which comprises removing nitrogen oxides from the coal-fired gas by means of a dry denitrating device which is charged with a catalyst, then removing dust therefrom by a dry electric dust collector disposed at a downstream position, and utilizing a wet lime-gypsum method to remove sulfur oxides and the dust.

As for the dry electric dust collector, its high efficiency is required for the prevention of air pollution, since the exhaust gas contains the dust at a high concentration.

The performance of the dry electric dust collector depends largely upon an electrical resistance value of the dust, and when the electrical resistance value is high, the performance of the dust collector is at a low level.

It is now known that the electrical resistance value of the dust is under the influence of components contained in the dust but is affected also by a content of an alkali, particularly sodium, and that when the content of sodium is low, the electrical resistance value is high, with the result that the performance of the electric dust collector is low. The content of sodium varies with each kind of coal, and in the case that a variety of coals are employed as the fuel, the coal which is low in sodium content must be used on occasions. At this time, the electric dust collector has a low performance disadvantageously. As its preventive measure, it has been heretofore taken to add sodium carbonate to the coal being used so as to heighten the sodium content in the dust.

Now, a conventional method for treating the exhaust gas will be described in reference to FIG. 2.

Coal is first fed to a coal-fired boiler 1 through a coal feed line 2 and is then burned therein. At this time, a modifier such as sodium carbonate is added to the coal through a modifier feed line 3 so as to improve the performance of a dry electric dust collector 12. An exhaust gas generated in the coal-fired boiler 1 is led through a duct 4 to a dry denitrating device 6 which is charged with a catalyst, and nitrogen oxides present in the exhaust gas are removed therefrom by an ammonia gas 5 being fed as a reducing gas. Then, the exhaust gas is led through a duct 7 to a high-temperature gas heater 8, in which it is heat-exchanged with air coming through an air inflow line 10. The air which has been warmed up by the heat exchange is guided to the boiler 1 through an air feed line 11 and is then utilized as air for coal combustion therein.

On the other hand, the exhaust gas discharged from the high-temperature gas heater 8 is led through a duct 9 to the dry electric dust collector 12, in which the dust contained in the exhaust gas is removed therefrom and is then discharged from the system through a line 13. Afterward, the exhaust gas, from which almost all the dust has been removed, is fed through a duct 44 to a low-temperature gas heater 15, in which it is heat-exchanged with an outflow gas coming through a duct 18 from a wet desulfurizing device 17. The exhaust gas which has been cooled by the heat exchange is led to the wet desulfurizing device 17 through a duct 16. In the wet desulfurizing device 17, the exhaust gas is brought into contact with a sprayed absorbing liquid in order to absorb and remove a sulfurous acid gas contained in the exhaust gas therefrom. The outflow gas from the wet desulfurizing device 17 is heated in the low-temperature gas heater 15 and is then discharged from the system through a duct 19.

To the wet desulfurizing device 17, a lime slurry and, if necessary, an oxidation accelerator are fed through a line 20, and in the device 17, the sulfurous acid gas is absorbed to thereby form calcium sulfite. The latter is in turn oxidized by oxygen present in the exhaust gas to be converted into gypsum. Since water is evaporated in the wet desulfurizing device 17, supplementary water is fed correspondingly through a line 28. The gypsum slurry formed in the wet desulfurizing device 17 is fed through a line 21 to a dehydrating machine 22, in which dehydration is performed to form a by-product system 23. The latter is taken out from the system and is afterward utilized somewhere else.

On the other hand, a filtrate in the dehydrating machine 22 is delivered through a line 24 to a raw material tank 25 as a modifier for the preparation of the absorbing liquid, and in the tank 25, the delivered filtrate is mixed with an absorber, i.e., limestone, slaked lime or the like fed through a line 26.

Further, a portion of the filtrate is drawn out through a line 27 and is then delivered to a waste liquid treating device 29 to the sake of a concentration adjustment of impurities in the system. To the waste liquid treating device 29, a neutralizer for the waste liquid, such as slaked lime, is added through a line 30, so that sulfate ions and dissolved metals are deposited in the form of gypsum and hydroxides, and the latter are then discharged from the system as a solid sludge 31 containing them. The waste liquid which has undergone the solid deposition treatment is discharged from the system through a waste liquid discharge line 32.

The conventional method just described has the following drawbacks:

(1) Since sodium carbonate is added to the coal for the purpose of improving the performance of the dry electric dust collector 12, a sodium concentration in the dust rises, and a larger amount of ash is deposited on the catalyst with which the denitrating device 6 is charged, thereby bringing about a pressure loss of the denitrating device 6 and accelerating deterioration of the catalyst.

With regard to the catalyst for the coal-fired exhaust gas denitrating device, its carriers which are mainly used include porous materials such as titania, silica, magnesia and zirconia, and its activators which are mainly used include oxides and sulfates of metals such as vanadium, tungsten, molybdenum, manganese and chromium. Further, the catalyst can take a shape such as a lattice, a honeycomb, a pipe or a plate. When salts of alkali metals such as sodium and potassium in the dust penetrate into the denitrating catalyst, an activity of the catalyst will deteriorate, and the greater the amount of the penetrating alkali metal, the greater is its activity deterioration. In consequence, the increase in the sodium concentration in the dust which will be fed to the dry denitrating device 6 will accelerate the deterioration of the catalyst, and in the end, the exchange of the catalyst will be required, which is not economical. In addition, the pressure loss of the denitrating device 6 will rise in a short period of time, and accordingly the boiler must be stopped for cleaning such as the removal of the deposited ash, which is inconvenient.

(2) In order to prevent impurities from being deposited in the system of the wet desulfurizing device 17, treatment of the waste liquid is carried out. In this case, a discharge liquid from a discharge line is a neutral liquid from which sulfate ions, dissolved metals and most of suspended solids have been removed, but chlorides still remain therein in the form of chlorine ions, because of their high solubility. Thus, if this discharge liquid is employed as the supplementary water for the wet desulfurizing device 17, the chlorine ions will not be eliminated from the system and will thus be accumulated therein, and their concentration will be increased gradually therein. Such a situation will lead to troubles such as the corrosion of device members, the deterioration in desulfurization performance and the occurrence of scaling. For this reason, this discharge liquid cannot be utilized as the supplementary liquid for the wet desulfurizing device 17.

(3) The treatment of the sludge is necessary.

Although the gypsum of the by-product is utilizable as raw materials for cements and boards, the sludge containing various metallic oxides, the gypsum and a fly ash has no utility value, and what is worse, prior to its disposal, a treatment for rendering the sludge harmless is required.

OBJECT AND SUMMARY OF THE INVENTION

An object of the present invention is to provide a method by which drawbacks of conventional methods can be overcome and which improves the performance of a dry electric dust collector and allows no or a smaller waste liquid to flow from a wet desulfurizing device, without involving deterioration of a catalyst, which is applied to the dry denitrating device, and the rise of pressure loss.

The present invention is directed to a method for treating an exhaust gas which comprises leading a coal-fired exhaust gas to a dry denitrating device, removing oxides of nitrogen from the exhaust gas in the dry denitrating device, leading the exhaust gas to a dry electric dust collector and a wet waste smoke desulfurizing device disposed at downstream positions, and removing dust from the exhaust gas in these devices, the aforesaid method being characterized in that a modifier-containing solution is sprayed into the exhaust gas flowing between the dry denitrating device and the dry electric dust collector, and the resulting dry solids are then collected together with the dust by the dry electric dust collector.

The above mentioned and other objects, features and benefits of the present invention will become more definite from the following detailed description in reference to the accompanying drawings.

DETAILED DESCRIPTION OF PREFERRED EMBODIMENTS

Now, one embodiment of a method regarding the present invention will be described in reference to FIG. 1.

Figure 1:
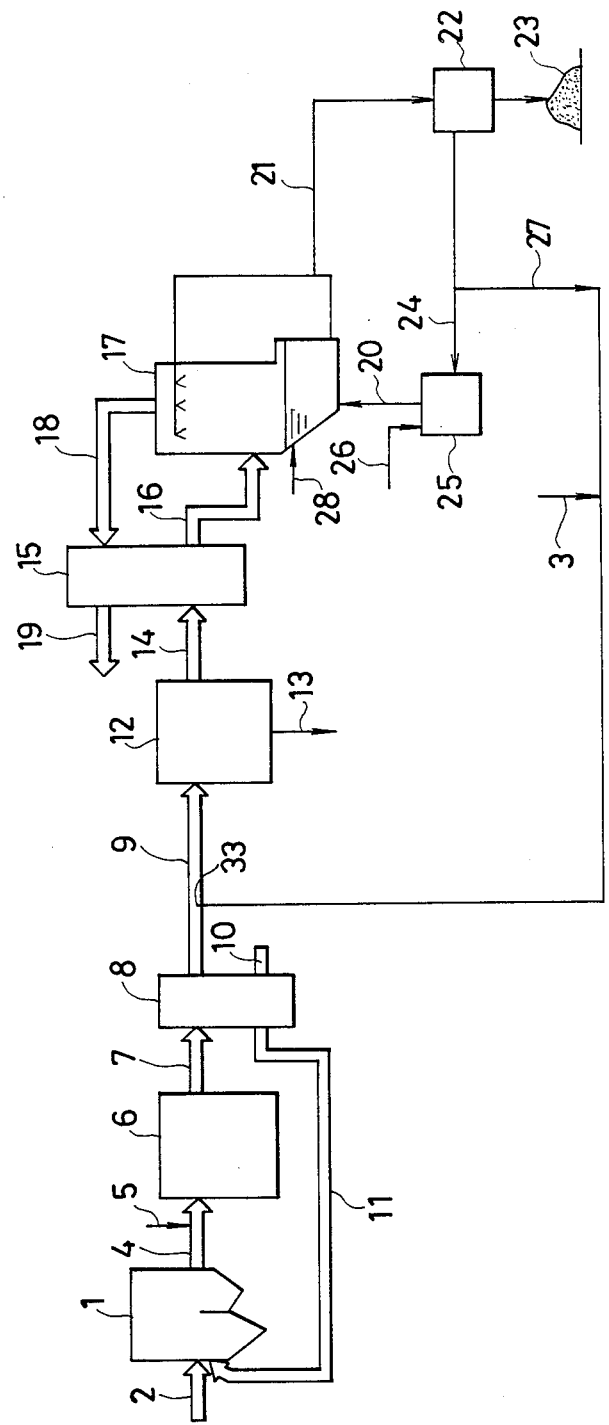
FIG. 1 is a flow sheet illustrating one embodiment of the present invention.
Figure 2:
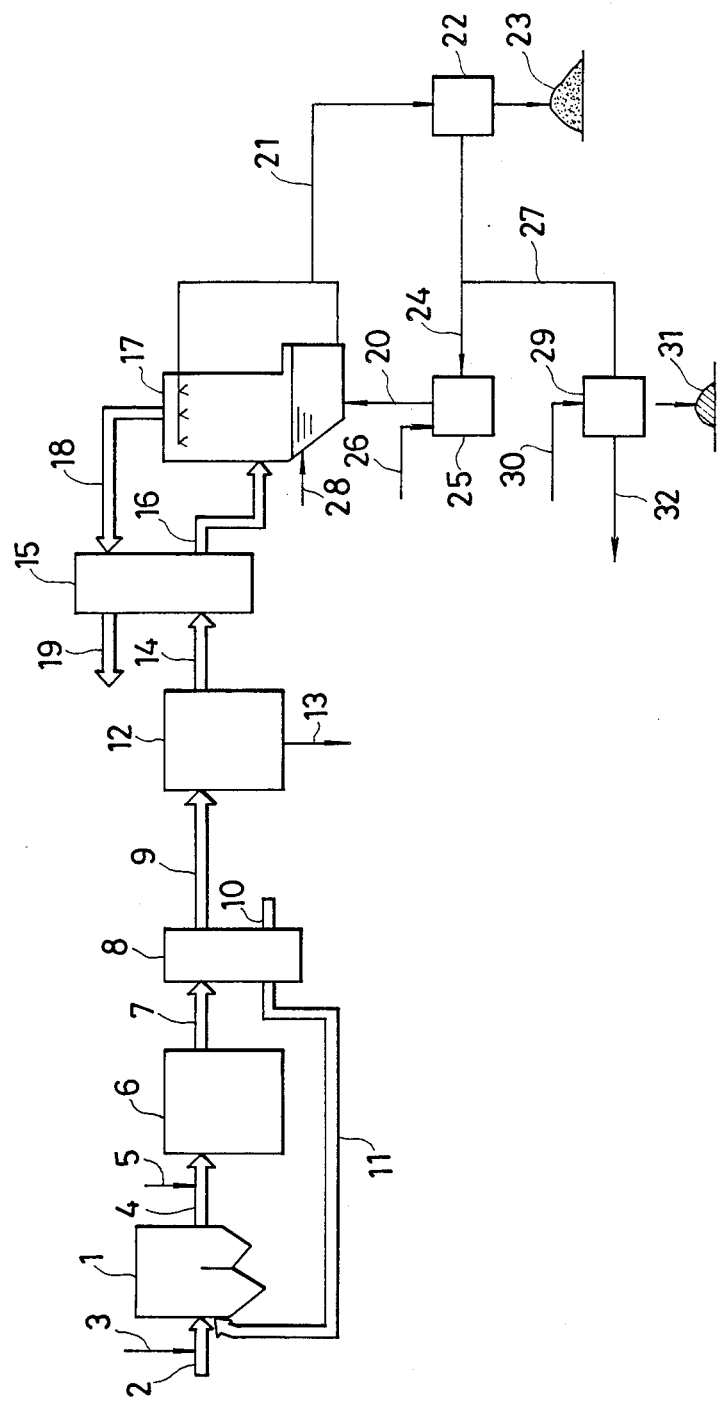
FIG. 2 is a flow sheet illustrating a conventional method.

In FIG. 1, the same symbols as in FIG. 2 represent the same members, and therefore these members and their functions will be omitted. That is, reference numerals 1, 2, and 4 to 28 are all the same as in FIG. 2. The numerals 29 to 32 in FIG. 2 are deleted in FIG. 1, and instead a spray device 33 for a modifier-containing solution is additionally provided in FIG. 1. Further, a modifier feed line 3 is provided in the middle of the waste liquid line 27.

A gypsum slurry coming from the wet desulfurizing device 17 is fed to the dehydrating machine 22 through the line 21 and is then taken out as the by-product gypsum 23. On the other hand, the filtrate in the dehydrating machine 22 is partially drawn out through the line 27, and a modifier, such as sodium carbonate, sodium hydroxide or sodium sulfate, is introduced into the line 27 through the modifier feed line 3. Afterward, the waste liquid containing the modifier is sprayed through a spray device 33 into the high-temperature exhaust gas containing the dust in the duct 9 between the dry denitrating device 6 and the dry electric dust collector 12. The sprayed waste liquid containing the modifier is evaporated by heat energy of the exhaust gas in the duct 9 in order to form dry solids, and the latter are collected together with the dust by the electric dust collector 12 and are then discharged through a collection line 13 from the system.

At this time, an amount of the modifier to be added is such that a ratio of sodium in the dust which will stream through the dry electric dust collector 12 is within the range of 0.5 to 3% by weight in terms of sodium oxide. Such an addition of the modifier permits lowering an electrical resistance value of the dust and thereby heightening the dust collecting efficiency in the dry electric dust collector 12.

As the spray device 33, an ultrasonice nozzle or the like is preferred, because such a nozzle can effectively spray the modifier solution in the state of fine particles each having a diameter of 100 microns or less. The reasons why the ultrasonic nozzle is preferable are than the fine particles of the spray solution can be promptly dried and solidified in the exhaust gas and that sodium added as the modifier can be uniformly mixed with the dust in order to thereby lower the electrical resistance value of the dust.

For the purpose of heightening the efficiency of the electric dust collector 12, it is preferred that the amount of the spray solution be increased, in addition to the above mentioned formation of the fine particles of the spray solution. However, when the amount of the spray solution is increased unreasonably, the solution cannot be evaporated perfectly, and the remaining solution will have a bad influence on the electric dust collector 12 and will lower a temperature of the exhaust gas excessively, with the result that the downstream equipment will be affected largely. In consequence, the amount of the spray solution usually preferably is about ⅓ of its maximum amount which can be evaporated by the exhaust gas, and when the spray solution is added thereto in such an amount, a temperature drop of the exhaust gas will be 15° C. or less, conveniently. In the case of only expecting the performance improvement in the electric dust collector 12, the waste liquid from the waste smoke wet desulfurizing device 17 may be subjected to a usual treatment, and another modifier-containing solution may be differently sprayed through the spray device 33.

According to the method of the present invention, the performance of the dry electric dust collector can be improved without involving any activity drop of the dry denitrating catalyst and any pressure loss rise of the denitrating device. Conventionally, one of the main causes which require the waste liquid treatment in the wet desulfurizing device is the accumulation of the chlorine ions in the system. However, according to the method of the present invention, the chlorine ions can be discharged in the form of solid chlorides together with the dust through the line 13, and therefore any treatment of the waste liquid is not necessary. In addition, since the exhaust gas from the coal-fired boiler is utilized as the heat source for the evaporation of the waste liquid, it is unnecessary to supply a great deal of energy for the evaporation from the outside, which fact is economically excellent.

EXAMPLE 1

By the use of such a pilot plant as shown in FIG. 1 which could treat 4,000 $m^3N/H$ of a coal-fired exhaust gas, a method of the present invention was carried out.

Table 1 given below sets forth properties of the exhaust gas, into which any waste liquid is not sprayed yet, at an inlet of a dry electric dust collector 12.

TABLE 1

Properties of the exhaust gas at the inlet of the dry electric dust collector 12.

| Flow Rate of Gas | 4,000 $m^3/H$ |
|---|---|
| Temperature of Gas | 170° C. |
| Water Concentration in Gas | 8.1% |
| Concentration of $SO_2$ | 420 ppm |
| Concentration of HCl | 3 ppm |
| Concentration of HF | 6 ppm |
| Concentration of Dust | 18.5 $g/m^3N$ |

Under conditions of the dry electric dust collector that a dust collection area per unit amount of the gas was 27 $m^2/m^3 \cdot s^{-1}$ and a current density was 0.3 $mA/m^2$, a dust concentration in the exhaust gas at an outlet of the dust collector was 2.1 $g/m^3N$. Further, a sodium concentration in the collected dust was 0.1% by weight in terms of sodium oxide.

Next, sodium carbonate was fed at a flow rate of 1.3 kg/H through a modifier feed line 3 to the waste liquid coming from the wet denitrating device 17 at a flow rate of 40 l/H, and the waste liquid containing the sodium carbonate was then sprayed into the exhaust gas through an ultrasonic binary fluid nozzle (spray device 33) utilizing air provided nearly in the center of a dust 9, which was circular in its sectional view, having an internal diameter of 400 mm. At this time, air was also sprayed thereinto simultaneously therewith through the nozzle 33. The sprayed waste liquid was evaporated and dried immediately to form solids, and the latter were collected together with the dust by the dry electric dust collector 12. In this case, a dust concentration at the outlet of the dry electric dust collector was 950 $mg/m^3N$, and a sodium concentration in the collected dust was 1.1% by weight in terms of sodium oxide. A hydrogen chloride concentration in the exhaust gas at the outlet of the dry electric dust collector was 3 ppm, which was identical with that of the exhaust gas before the spray step, which fact indicated that chlorine ions were removed as solid chlorides.

This example confirmed that the present invention could achieve the performance improvement in the dry electric dust collector and no outflow of the waste liquid from the wet desulfurizing device, simultaneously.

EXAMPLE 2

The same procedure in Example 1 was repeated with the exception that the feed rate of sodium carbonate was varied, in order to carry out a performance test for a dry electric dust device 12. The obtained results are set forth in Table 2, by which the effectiveness of the present invention can be confirmed.

TABLE 2

Results of the dust collection test for the dry electric dust collector.

| Feed Rate of Sodium Carbonate (kg/H) | Concentration of Sodium Oxide in Dust (wt %) | Collection Rate of Dry Electric Dust Collector (%) |
|---|---|---|
| 0 | 0.1 | 88.6 |
| 1.3 | 1.1 | 94.9 |
| 2.5 | 2.0 | 96.1 |
| 3.3 | 2.6 | 96.4 |

We claim:

1. A method for treating an exhaust gas which comprises leading a coal-fixed exhaust gas to a dry+denitrating device and removing oxides of nitrogen from said exhaust gas in said device; leading said exhaust gas from said denitrating device to a dry electric dust collector and a wet waste smoke desulfurizing device disposed at downstream positions, and removing dust from said exhaust gas in these devices, characterized in that said method further comprises adding a sodium compound to all or a portion of a waste liquid from said wet desulfurizing device thereby forming a sodium compound containing solution of 1% to 4% sodium; spraying said sodium compound containing solution into said exhaust gas flowing between said dry denitrating device and said dry electric dust collector in such a way that the concentration of sodium in said exhaust gas is in the range of 0.5% to 3% by weight in terms of sodium oxides in the dust which will follow through said dry electric dust collector; and then collecting the resulting dry solids together with said dust by said dry electric dust collector.

2. A method for treating an exhaust gas according to claim 1 wherein said sodium compound-containing solution is sprayed in the state of fine particles each having a diameter of 100 microns or less.

* * * * *